US011272687B2

(12) United States Patent
Blanch (10) Patent No.: US 11,272,687 B2
(45) Date of Patent: Mar. 15, 2022

(54) WATER WALKING LEASH (71) Applicant: Dexter Blanch, Shreveport, LA (US)

(72) Inventor: Dexter Blanch, Shreveport, LA (US)

(*) Notice: Subject to any disclaimer, the term of this patent is extended or adjusted under 35 U.S.C. 154(b) by 158 days.

(21) Appl. No.: 15/980,683

(22) Filed: May 15, 2018

(65) Prior Publication Data
US 2019/0350166 A1 Nov. 21, 2019

(51) Int. Cl.
*A01K 7/00* (2006.01)
*A01K 27/00* (2006.01)
*A45F 3/16* (2006.01)

(52) U.S. Cl.
CPC ............ *A01K 7/00* (2013.01); *A01K 27/001* (2013.01); *A01K 27/003* (2013.01); *A45F 3/16* (2013.01); *A45F 2003/166* (2013.01)

(58) Field of Classification Search
CPC ...... A01K 7/00; A01K 27/001; A01K 27/003; A01K 27/00; A01K 27/004; A45F 3/16; A45F 2003/166
See application file for complete search history.

(56) References Cited

U.S. PATENT DOCUMENTS

| | | | | |
|---|---|---|---|---|
| 5,996,836 | A * | 12/1999 | Betras | A45F 3/16 220/709 |
| 6,283,344 | B1 * | 9/2001 | Bradley | A42B 1/24 222/175 |
| 6,932,027 | B1 * | 8/2005 | Whitney | A01K 27/00 119/770 |
| 8,001,623 | B2 * | 8/2011 | Gertsch | A42B 3/042 2/422 |
| 8,613,262 | B1 * | 12/2013 | Mergard | A01K 7/00 119/72 |
| 2004/0065703 | A1 * | 4/2004 | Bellucci | A45F 3/20 224/148.5 |
| 2007/0012732 | A1 * | 1/2007 | Adams | A01K 7/00 224/148.2 |
| 2007/0187442 | A1 * | 8/2007 | Martin | A01K 7/00 224/148.2 |
| 2008/0173257 | A1 * | 7/2008 | Steiner | A01K 27/004 119/796 |
| 2012/0067290 | A1 * | 3/2012 | Mainini | A01K 15/02 119/72 |
| 2013/0152869 | A1 * | 6/2013 | Morton | A01K 13/001 119/665 |
| 2013/0298838 | A1 * | 11/2013 | Belmonte | A01K 7/00 119/72 |
| 2015/0196010 | A1 * | 7/2015 | Orubor | A01K 27/004 119/72 |
| 2015/0373949 | A1 * | 12/2015 | Eckert | B05B 11/0037 119/792 |
| 2016/0095294 | A1 * | 4/2016 | Valerio | A01K 27/001 119/671 |

(Continued)

*Primary Examiner* — Magdalena Topolski
*Assistant Examiner* — William L Gmoser (57) ABSTRACT The present invention teaches a system for hydrating a dog during a walk or a jog, including a hand-held rehydrating liquid reservoir, a tube for feeding the rehydrating liquid to a dog collar, and a dog collar that presents the rehydrating liquid in proximity of a dog's mouth. The liquid transport arm may be one quarter or one half elliptical in shape. The liquid transport arm may include mouthpiece which may be a flavored treat, wherein the flavored treat may include holes allowing the rehydrating liquid to pass therethrough for presentment to the dog's mouth.

14 Claims, 10 Drawing Sheets (56) References Cited

U.S. PATENT DOCUMENTS

| | | | | |
|---|---|---|---|---|
| 2017/0055495 A1* | 3/2017 | Atkins | .................... | A01K 7/00 |
| 2017/0071163 A1* | 3/2017 | Glasser | ................ | A01K 27/008 |
| 2019/0098873 A1* | 4/2019 | Bennett | ................ | A01K 27/008 |

* cited by examiner

WATER WALKING LEASH

FIELD OF INVENTION

This invention relates to dog leashes.

BACKGROUND OF THE INVENTION

Dogs are generally safe to drink the water their owners place in their water bowls. Standing water, water from pools, rivers and lakes all pose a risk to the pet's overall health. Standing water may have parasites, protozoa, or chemical run-off that when ingested interferes with the dog's digestive tract. Protozoans, such as *Giardia* and *Cryptosporidium*, or flatworms such as schistosomiasis, which can be found in standing water, affect a dog's gastrointestinal systems if they are ingested. Exposure to these protozoans can cause severe diarrhea and intestinal bleeding. Many of our lake and river waters also contain high amounts of hazardous chemicals such as pesticides. If a pet regularly drinks from toxic lake or river water, the toxins can build up in the animal's system and slowly poison the animal's body over a long period of time. The kidneys and liver can be particularly affected by these chemicals if they are exposed to them on a regular basis.

Dog owners who walk or jog with their dogs are likely to encounter these polluted drinking sources frequently. Ordinarily, these owners will bring with them a separate water bottle and bowl specifically for hydrating their dog when they are far from a clean water source. Since the owner already carries a leash, it becomes inconvenient for the owner to carry additional equipment just to hydrate their dog. What is needed is a method or apparatus that will enable a dog owner, i.e. jogger or walker, to hydrate their dog without requiring the dog owner to carry additional equipment.

SUMMARY OF THE INVENTION

A dog hydration system and apparatus are disclosed which include various aspects not found in the prior art. According to one aspect of the present invention, a dog walker or jogger (called "dog walker" or a "walker" herein) uses the system of the present invention to rehydrate his dog during a walk without the need to carry additional equipment like a doggie bowl or bottled water for the dog.

According to various aspects of this invention, the dog walker transports a rehydrating liquid in a hand-held liquid reservoir which is connected to a flexible hose for receiving the rehydrating liquid. The flexible hose is further connected to a dog collar for delivering the rehydrating liquid to the dog collar. The dog collar, according to various aspects of the invention, is specially designed to receive the rehydrating liquid and to deliver the rehydrating liquid in proximity to the mouth of a dog wearing the dog collar. The rehydrating liquid may be placed in proximity to the dog's mouth using a liquid delivery arm. The liquid delivery arm may be positioned so that the dog may lick the liquid without being able to lick the liquid delivery arm In one aspect, a dog walker may control the operation of the hand-held liquid reservoir to deliver the rehydrating liquid to the flexible hose. The delivery may be controlled by manually actuating plunger which impedes or facilitates the free flow of the rehydrating liquid.

In another aspect of the invention, the dog collar includes an adjustable liquid transport arm for controlling the proximity of the rehydrating liquid being delivered to the mouth of the dog wearing the collar.

In another aspect of the invention, the position of the dog collar on the neck of the dog using a snout loop, wherein a snout loop encircles a portion of the dog's snout and is further connected to the collar.

In yet another aspect of the invention, the liquid transport arm is elliptical in shape such that the liquid delivery arm is fixed on both opposing sides of the dog collar.

In still another aspect of the invention, the liquid delivery arm includes a mouthpiece from which the rehydrating liquid is delivered to the dog's tongue.

DETAILED DESCRIPTION OF THE PREFERRED EMBODIMENT

Figure 1:
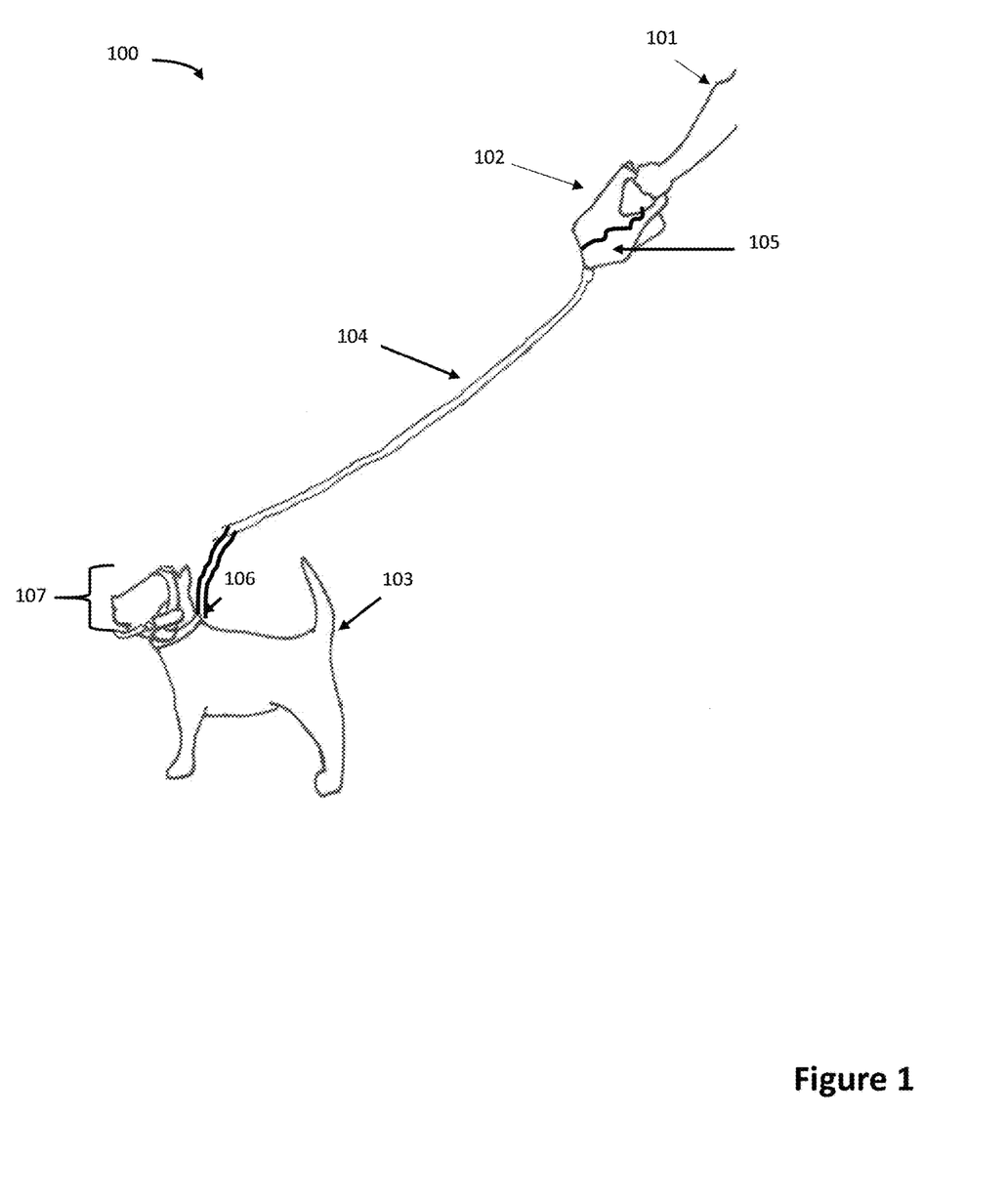
FIG. 1 is an exemplary embodiment of a dog hydrating system and apparatus according to preferred embodiments of the invention.

FIG. 1 is a depiction of the dog hydrating system 100 according to various embodiments of the present invention. Dog hydrating system 100 is depicted in the environment in which it would ordinarily be used. As shown, dog hydrating system 100 may be used by a dog walker 101 when walking a dog 103. Dog hydrating system 100 may include a hand-held liquid reservoir 102 for holding, transporting and delivering a rehydrating liquid 105. The hand-held reservoir 102 may be coupled to a flexible hose 104 for receiving rehydrating liquid 105 from hand-held liquid reservoir 102. Flexible hose 104 may further connected to a dog collar 106. Flexible hose 104 receive rehydrating liquid 105 and transport rehydrating liquid 105 to a dog collar 106. The dog collar 106 may receive the rehydrating liquid 105 from flexible hose 104, and provide rehydrating liquid 105 in proximity to the mouth 107 of dog 103. During use, dog walker 101 may control delivery of rehydrating liquid 105 to flexible hose 104 (and subsequently to dog collar and in proximity to the mouth 107 of dog 103) by manually actuation (described more fully below).

Figure 2:
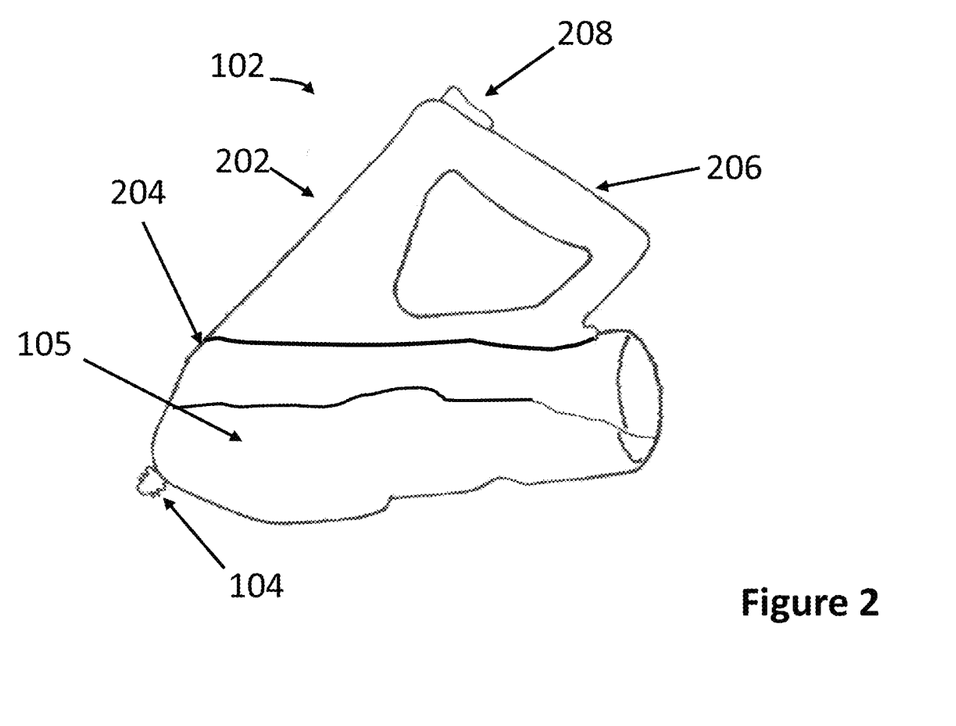
FIG. 2 is an exemplary embodiment of a hand-held liquid reservoir according to preferred embodiments of the invention.

FIG. 2 is a depiction of exemplary hand-held liquid reservoir 102 according to exemplary embodiments of the invention. Hand-held liquid reservoir 102 is of suitable size to be transported by a single human hand (not shown). As shown, hand-held reservoir 102 may include an outer body enclosure 202 including a rehydrating liquid tank 204 for holding rehydrating liquid 105. In alternate embodiments of the invention, Outer body enclosure 202 may comprise the rehydrating liquid tank 204. Outer body enclosure 202 any solid material suitable for holding a tank 204. Tank 204 may be a construction capable of holding a liquid such as rehydrating liquid 105. To facilitate carrying, hand-held liquid reservoir 102 may be further formed with a reservoir handle 206 that a dog walker 101 may use to grasp hand-held liquid reservoir 102.

As noted, during use, dog walker 101 may control the rate at which rehydrating liquid 105 is delivered to flexible hose 104. In one exemplary embodiment, hand-held liquid reservoir 102 may include a manually actuated trigger 208. Manually actuated trigger mechanism 208 may be included in outer body enclosure 202. Alternatively, manually actuated trigger mechanism 208 may be separate from outer body enclosure 202.

The movement of rehydrating liquid 105 to flexible hose 104 is facilitated by gravity. That is, rehydrating liquid 105 is drawn from rehydrating liquid tank 204 to flexible hose 104, and from flexible hose 104 to dog collar 106 by the force of gravity. Manually actuated trigger mechanism 208 may be constructed to impede the flow of rehydrating liquid tank 204 into flexible hose 104, as described more fully below. Once the manually actuated trigger mechanism 208 is manually actuated by, for example, a dog walker 101 finger, the impediment to the flow of rehydrating liquid 105 is removed and gravity draws the rehydrating liquid 105 into flexible hose 104.

Figure 3:
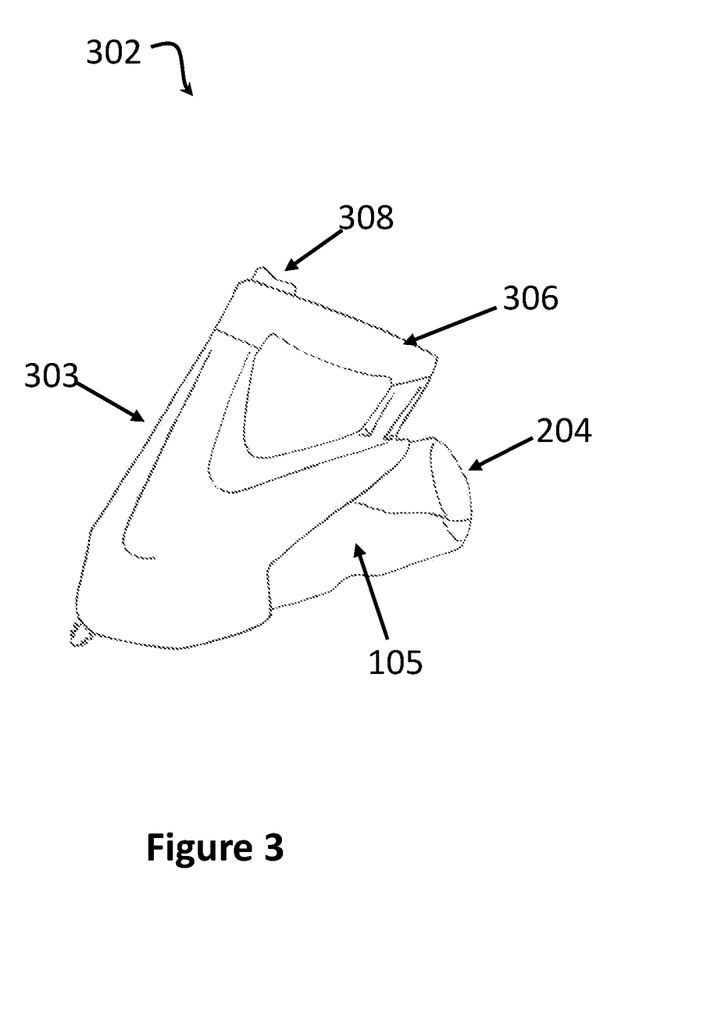
FIG. 3 is an exemplary embodiment of another hand-held liquid reservoir according to preferred embodiments of the invention.

FIG. 3 is an illustration of a hand-held liquid reservoir 302 in accordance with an alternate embodiment of the invention. Hand-held liquid reservoir 302 may include a reservoir handle 306 and a manually actuated trigger mechanism 308 of similar construction as was described above with respect to reservoir handle 206 and manually actuated trigger mechanism 208. As shown, hand-held liquid reservoir 302 may include a rehydrating liquid tank 204. In the embodiment shown, rehydrating liquid tank 204 may be separate and distinct from outer body enclosure 303.

Figure 4:
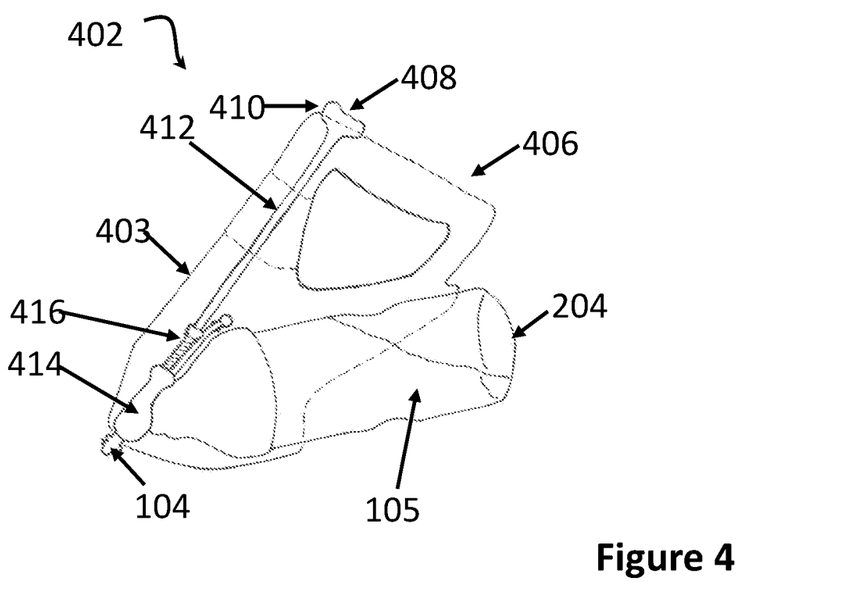
FIG. 4 is an exemplary embodiment of a cross-section view of a hand-held liquid reservoir according to preferred embodiments of the invention.

FIG. 4 is a cross section of another exemplary embodiment of a hand-held liquid reservoir 402 according to alternate embodiments of the invention. Hand-held liquid reservoir 402 may include an outer body enclosure 403, reservoir handle 406, rehydrating liquid tank 204 for holding rehydrating liquid 105, as is described with respect to the hand-held liquid reservoir 302 of FIG. 3. As shown, rehydrating liquid tank 204 may be a separate and distinct construction from outer body enclosure 403. Rehydrating liquid tank 204 may be attached to hand held liquid reservoir 402 in a manner that allows the rehydrating liquid tank 204 to be in communication with flexible hose 104. In one embodiment, the rehydrating liquid tank 204 may be affixed to outer body enclosure 403 by for example screwing, plugging, gluing, (or the like) rehydrating liquid tank 204 into or onto outer body enclosure 403.

Hand held liquid reservoir 402 may further include a manually actuated trigger mechanism 408 of similar construction as manually actuated trigger mechanism 308. Manually actuated trigger mechanism 408 is constructed to remove a barrier 414 that prevents the flow of rehydrating liquid 105 from rehydrating tank 204 into flexible hose 104. Manually actuated trigger mechanism 408 may comprise a trigger 410. In some embodiments, trigger 410 may be of any conventional construction. Flexible hose 104 may be a hose suitable for transporting a liquid. Flexible hose 104 may be constructed of a light weight plastic, rubber or light weight metal material.

Trigger 410 may be attached to a rod 412, which may be further attached to barrier 414 that prevents the flow of rehydration liquid 105. During operation of manually actuated trigger mechanism 408, a dog walker 101 may press trigger 410 with his finger. The pressing of trigger 410 in turn causes rod 412 to move in like direction to the pushing. The moving rod 412 in turn moves barrier 414. For example, when trigger 408 is pushed in a direction toward rehydrating liquid tank 105, barrier 414 is removed from the opening in rehydrating liquid tank 204, permitting rehydration liquid 105 to flow from rehydrating liquid tank 105 in to flexible hose 104. In another embodiment, rod 412 may be affixed with a spring 416 positioned to work in a direction opposite the direction of movement trigger 410. For example, when trigger 410 is pressed downward, the rod 412 will cause spring 416 to compresses. When the finger pressure on trigger 410 is released, spring 416 decompresses (extends) to force rod 412.

Figure 5:
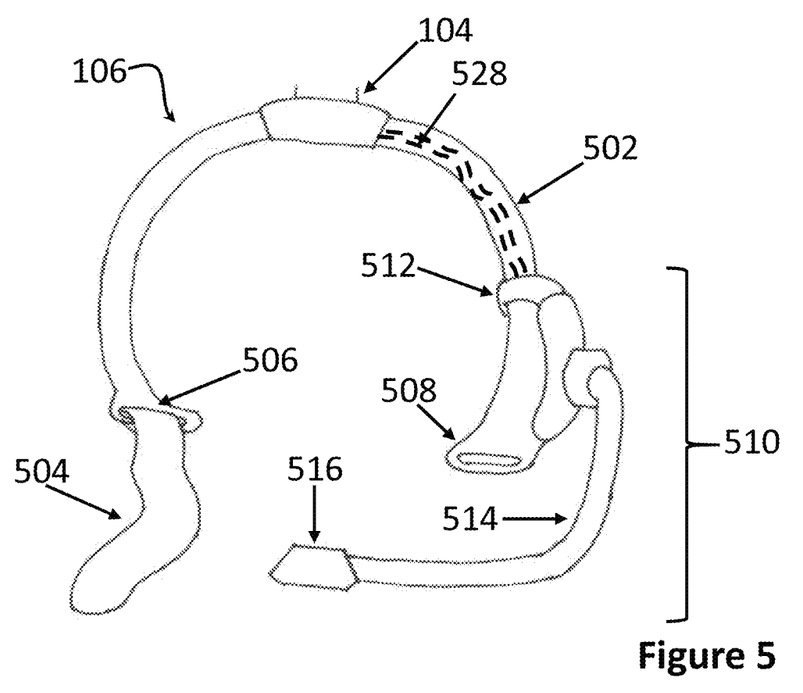
FIG. 5 is an exemplary embodiment of a dog collar according to preferred embodiments of the invention, wherein the flexible hose is external to the collar.

FIG. 5 depicts an exemplary dog collar 106 according to exemplary embodiments of the present invention. Dog collar 106 may include a neckband 502. Neckband 502 is constructed to encircle the neck of dog 103. Neckband 502 may be constructed to substantially encircle the neck of dog 103. In such an instance where neckband 502 substantially encircles the neck of dog 103, the portion of the neck of dog 103 that remains uncovered by neckband 103 may be covered by a second collar portion 504. That is dog collar 106 may comprise a neckband 502 and second collar 504, when taken together, encircle the neck of dog 103. Second collar portion 504 may be, for example, a strap, belt, chain, Velcro strap, or the like. Second collar portion 504 may be affixed to neckband 502 using any suitable fasteners 506, 508 such as, glue, rivets, screws, sewing, buckling, or the like.

As noted, dog collar 106 may receive rehydrating liquid 105 from flexible hose 104, and provide rehydrating liquid 105 in proximity to the mouth 107 of dog 103. To provide the rehydrating liquid 105, dog collar 106, may receive rehydrating liquid 105 from flexible hose 104 at neckband 502. In one exemplary embodiment, neckband 502 may further comprise an enclosed channel 528 for receiving rehydrating liquid 105. By "enclosed channel" what is meant is that the channel is formed as a conduit enclosed on top, bottom and 2 sides, and is capable of transporting liquid from one location to another location. Channel 528 may be located internal to neckband 502, such that the rehydrating liquid 105 flows internal to the exterior of the body of neckband 502. Dog collar 106 may further include a liquid transport arm 510 for transporting rehydrating liquid 105 from neckband 502 to in proximity of the mouth 107 of dog 103. In this way, rehydrating liquid 105 may be transported from flexible hose 104 to channel 528 to liquid transport arm 510. In exemplary embodiments described herein, flexible hose 104 may be coupled to enclosed channel 528, enclosed channel 528 may be coupled to liquid transport arm 510, such that rehydrating liquid 105 may be transported.

In one exemplary embodiment, liquid transport arm 510 may be constructed like a tube for transporting a liquid. In one embodiment, liquid transport arm 510 is flexible such that it may be moved into, and/or substantially fixed into, a desired shape. Liquid transport arm 510 may be flexed to include a curved arm section 514. Curved arm section 514 may be formed such that liquid transport arm 510 will curve to within proximity of mouth 107 of dog 103. As used herein, the proximity of the mouth 107 is any location that is in front of the dog 103 head, wherein the dog 103 will not be able to bite liquid transport arm 510; instead, liquid transport arm 510 is positioned such that only the tongue of dog 103 may contact liquid transport arm 510. Liquid transport arm 510 may be affixed to neckband 502 using a suitable mechanical coupling. Liquid transport arm 510 may be rotatably affixed to neckband 502 using a suitable mechanical coupling 512.

To direct the licking of the tongue of dog 103 at liquid transport arm 510, liquid transport arm 510 may include a perforated mouthpiece 516 from which the rehydrating liquid 105 is presented in proximity of the mouth 107 of dog 103. That is, rehydrating liquid 105 in curved arm section 514 of liquid transport arm 510 may exit liquid transport arm 510 at perforated mouthpiece 516. In another exemplary embodiment, dog walker 101 may want to encourage dog 103 to lick mouthpiece 516. In such an instance, mouthpiece 516 may be comprised of a dog treat, or a tongue brush, or the like.

Figure 6:
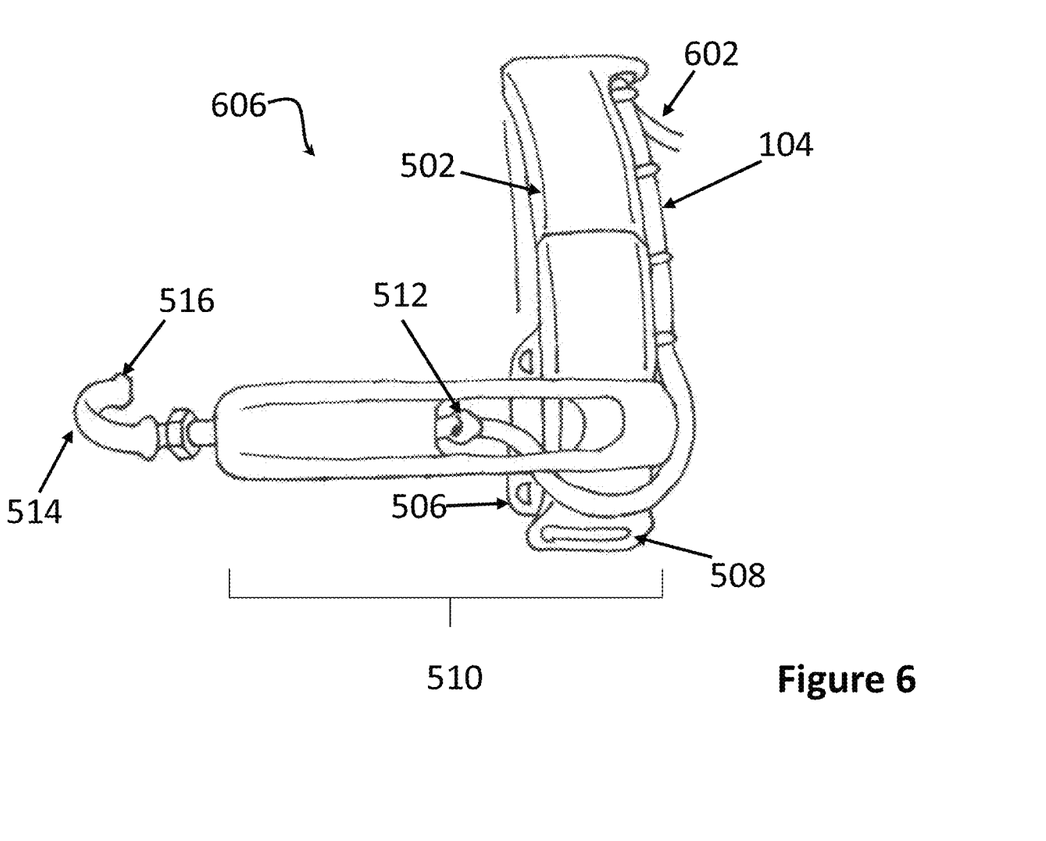
FIG. 6 is another exemplary embodiment of a dog collar according to preferred embodiments of the invention wherein the flexible hose is internal to the collar.

FIG. 6 includes another exemplary embodiment of dog collar 606 according to the present invention. Dog collar 606 may include a neckband 502 and liquid transport arm 510 of similar description as was described with respect to dog collar 106. In the embodiment shown in FIG. 6, Flexible hose 104 may be coupled directly to liquid transport arm 510, wherein flexible hose 104 is external to neckband 502. In the embodiment depicted, rehydrating liquid 105 may be transported to liquid transport arm 510 outside of neckband 502.

Figure 7:
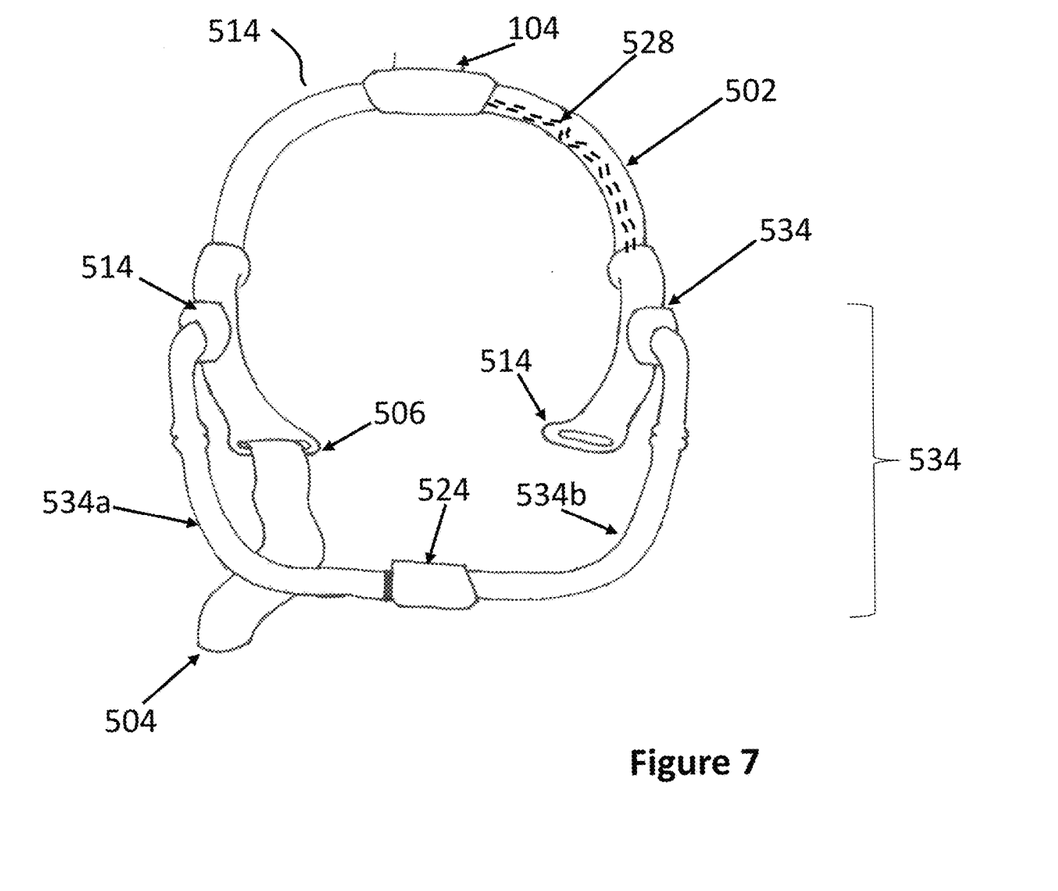
FIG. 7 is an exemplary embodiment of an elliptical shaped liquid transport arm.

FIG. 7 depicts another exemplary embodiment of dog collar 706 according to the present invention. Dog collar 706 may include a neckband 502, and an enclosed channel 528 of similar description as was described with respect to the enclosed channel of dog collar 106 of FIG. 5. Dog collar 706 may further include an elliptical liquid transport arm 534. Elliptical liquid transport arm 534 may also be tubular in shape. Elliptical liquid transport arm 534 is formed such that it may receive rehydrating liquid 105 and transport the rehydrating liquid proximity to the dog's mouth 107. By "elliptical" what may be meant is that liquid transport arm 534 is in the general shape of a half-ellipse. The liquid transport arm 534 may be segmented such that it comprises a left liquid transport arm 534a and a right liquid transport arm 534b. Left liquid transport arm 534a may extend from liquid transport arm 534 vertex and extend in a direction toward the first co-vertex of liquid transport arm 534. Right liquid transport arm 534b may extend from liquid transport arm 534 vertex and extend in a direction toward the second co-vertex of liquid transport arm 534. A first-end of right liquid transport arm 534a may be coupled to a first-end of left liquid transport arm 534b so that rehydrating liquid transported by right liquid transport arm 534a may be received by, and transported by, left liquid transport arm 534b. Alternatively, rehydrating liquid received by left liquid transport arm 534b may be transported to and received by liquid transport arm 534a.

In still another exemplary embodiment of liquid transport arm 534 at least one of the left transport arm 534a or 534b is obstructed, or partially obstructed so that rehydrating liquid 105 does not freely flow therethrough. For example, right liquid transport arm 534a may be tubular in shape, but may be solid and not hollow. Alternatively, a portion of right liquid transport arm 534a may be obstructed so that rehydrating liquid 105 may flow only partially therethrough.

Figure 8:
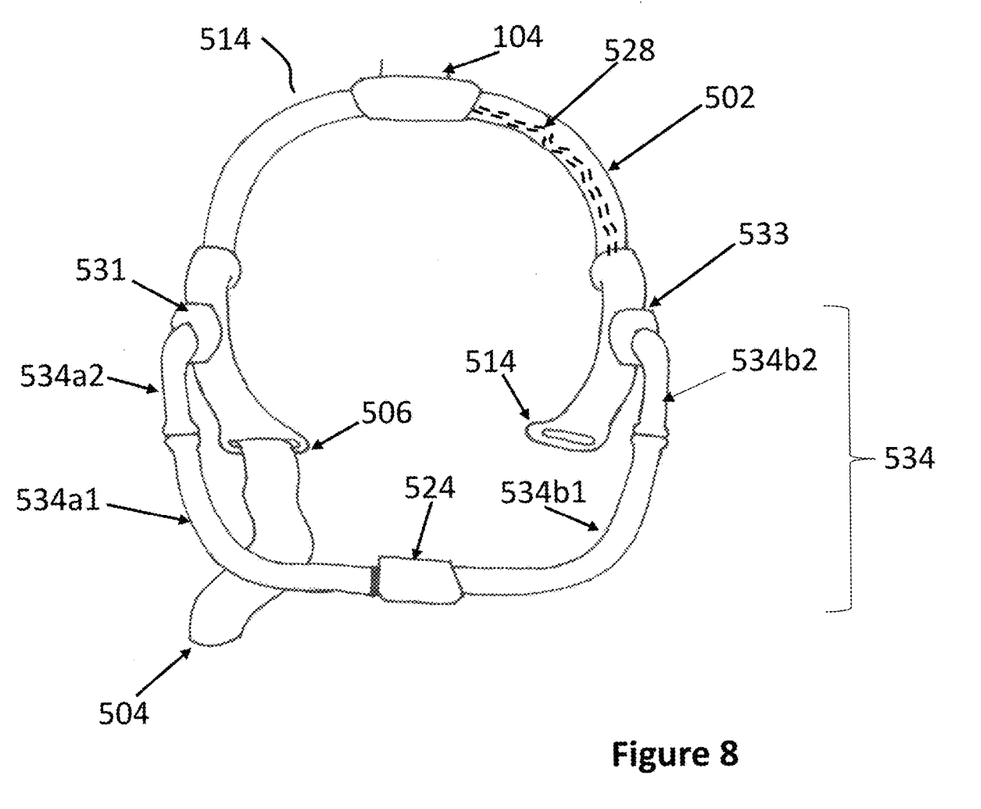
FIG. 8 is another exemplary embodiment of the dog collar of the present invention.

In another exemplary embodiment of liquid transport arm 534 shown in FIG. 8, right liquid transport arm 534a and left liquid transport arm 534b may be further partitioned into distinct pieces. That is, liquid transport arm 534 may be further partitioned into a forward left liquid transport arm 534a1 and a rearward left liquid transport arm 534a2, where rearward left liquid transport arm 534a2 is coupled to neckband 502 by coupling means 531. Preferably, rearward right liquid transport arm 534a2 is coupled to the right side of neckband 502.

Similarly, liquid transport arm 534 may be further partitioned into a forward right liquid transport arm 534b1 and a rearward right liquid transport arm 534b2, where rearward right liquid transport arm 534b2 is coupled to neckband 502. Preferably, rearward right liquid transport arm 534b2 is coupled to the right side of neckband 502 using coupling means 533.

In another exemplary embodiment, liquid transport arm 534 may include a mouthpiece 524 substantially positioned at liquid transport arm 534 vertex. Mouthpiece 524 may be of similar construction as was described with respect to mouthpiece 516 of FIG. 5. In one embodiment, mouthpiece 524 may be positioned in proximity of the dog's mouth 107. In one exemplary embodiment, mouthpiece 524 is hollow, permitting rehydrating liquid 105 to flow freely from left liquid transport arm 534b to right liquid transport arm 534a, and vise versa. Mouthpiece 524 may be constructed with holes therethrough such that the rehydrating liquid may flow freely to the proximity of the dog's mouth.

Liquid transport arm 534 may be coupled to neckband 502 at the co-vertexes of the semi-minor axis of the half-elliptical shaped liquid transport arm 534. Liquid transport arm 534 may be coupled to neckband 502 at a first coupling location 533 (location of first co-vertex) and a second coupling location 531 (location of second co-vertex) on liquid transport arm 534.

As described herein, "coupling" may be any conventional coupling means. For example, coupling may mean that the liquid transport arm 534 is affixed such that rehydrating liquid 105 is provided to and enclosed in channel 528, such that rehydrating liquid 105 is able to be provided to liquid transport arm 534. A suitable coupling comprises a pivotable joint for allowing pivoting of liquid transport arm 534. The coupling may permit liquid transport arm 534 to pivot from below the dog's snout to in front of the dog's snout.

The shape of liquid transport arm 534 may be such that the vertex of liquid transport arm 534 is in proximity to the mouth 107 of dog 103. In one embodiment, the mouth of dog 103 is located substantially near the focus of liquid transport arm 534. Liquid transport arm 534 may be a hollow tube, such that rehydrating liquid 105 that is received by liquid transport arm 534 is received into and traverses around the inside of liquid transport arm 534. Rehydrating liquid 105 may traverse from the first covertex at coupling at 533 to the second co-vertex at coupling 531. In another exemplary embodiment, liquid transport arm 534 may be only partially hollow, such that rehydrating liquid 105 that is received by liquid transport arm traverses only partially around the liquid transport arm 534. For example, an obstruction may be included within liquid transport arm 534 to prevent the rehydrating liquid from traversing between co-vertexes. In another exemplary embodiment, liquid transport arm 534 may include a mouthpiece 524 located substantially at the vertex of liquid transport arm 534. Mouthpiece 524 may be of substantially similar construction as was described with respect to mouthpiece 516.

Figure 9:
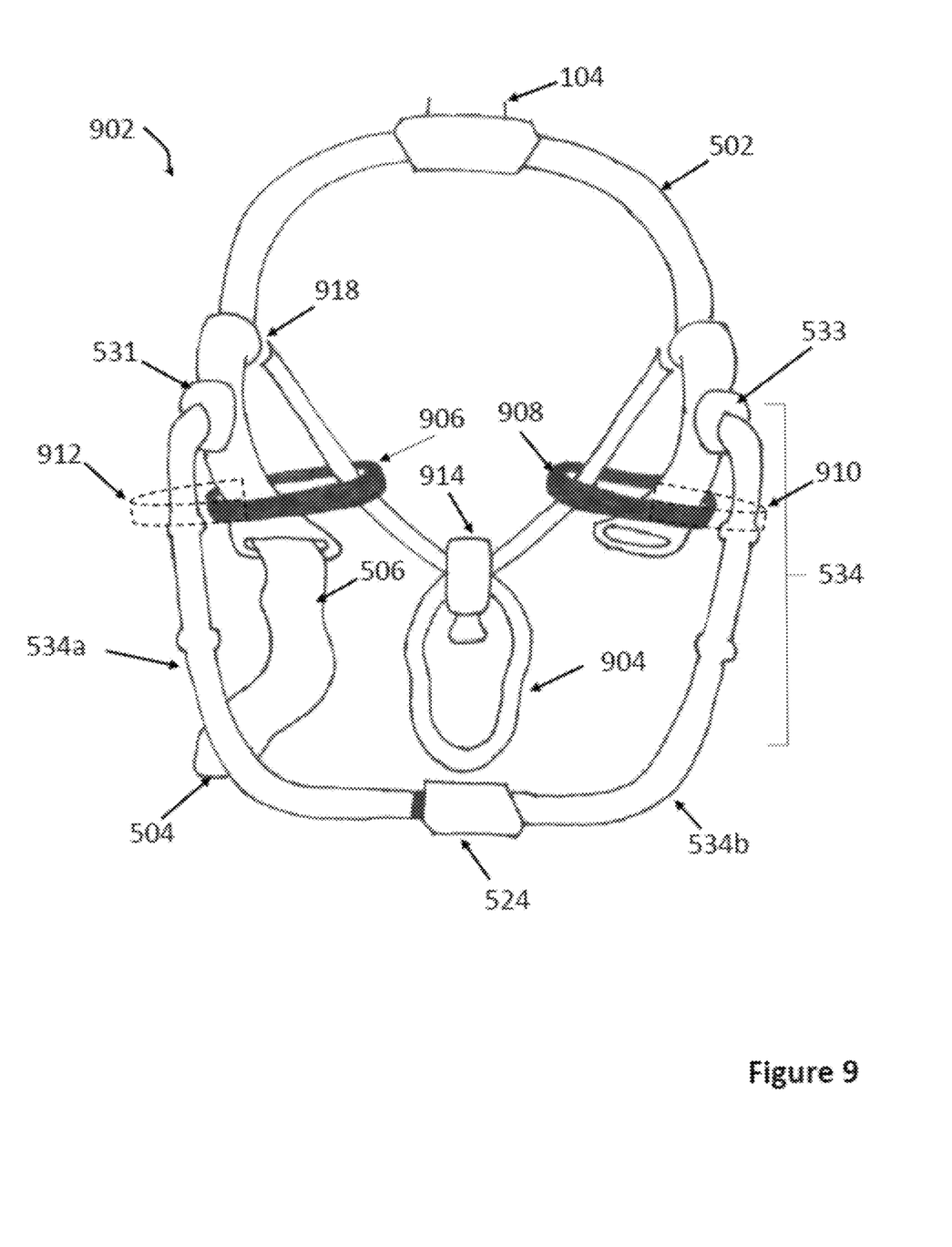
FIG. 9 is an exemplary dog collar according to present invention.

In some cases, it may be necessary to further stabilize the liquid transport arm, such as when the dog moves his head horizontally. In this instance, the dog's head may come in contact with the right or left side of the liquid transport arm. More importantly, the dog's mouth would be out of position for licking the rehydrating liquid being delivered in proximity to the dog's mouth. In yet another embodiment of the invention shown in FIG. 9, dog collar 902 may use means for stabilizing the liquid transport arm 934 against the horizontal movement of the dog's head. Dog collar 902 may be of similar construction as was described with respect to any of the inventive dog collars described herein. For the sake of brevity, FIG. 9 illustrates an exemplary embodiment of the dog collar comprising the half-elliptical shaped liquid transport arm, where similar character references depict elements of the dog collars discussed above.

As shown dog collar 902 includes a snout loop 904 which is configured to encircle the dog's snout when in dog collar 902 is in operation. Snout loop 904 may be any construction capable of comfortably encircling a dog's snout. Snout ring 904 is further affixed to neckband 502 at a first snout coupler 916, for example on a right portion of neckband 502, and also further affixed to neckband 502 at a second snout coupler 918 on a left portion of neckband 502. The snout loop may be adjustable to accommodate pointed snouts, or short round snouts. For example, where the snout loop 904 is made of a loose pliable material, such, for example, as rubber, TPE, or a woven string, the circumference of snout loop 904 may be adjusted to fit the dog's snout. For example, if snout loop 904 is comprised of a string affixed at first and second snout coupler 916, 918, the string may be looped around the dog's snout, wherein the loop is formed by using, for example, means 914 for fixing a left side and a right side of the snout loop 904, by for example, a cord lock, rope clamp, snaps or the like capable of allowing the circumference of snout loop 904 to be adjusted.

To further confine the dog's horizontal movement to within the liquid transport arm 534, dog collar 902 may further include means 906, 908, 910, 912, for stabilizing the snout loop 904 to liquid transport arm 534. In the embodiment shown, snout loop 904 may be secured to liquid hydrating arm 534 to ensure that when the dog's head moves, it moves in tandem with the liquid transport arm 534. For example, as shown, snout loop 904 may be affixed to the left liquid transport arm 534a by a means for connecting snout loop 904 to left liquid transport arm 534a that ensures that left liquid transport arm 534a and snout loop 904 move in tandem. Similarly, snout loop 904 may be affixed to the right liquid transport arm 534b by a means for connecting snout loop 904 to right liquid transport arm 534b that ensures that right liquid transport arm 534b and snout loop 904 move in tandem. By moving in tandem, what is meant is that if the snout loop 904 and the liquid transport arm moves substantially simultaneously in the same direction.

In one exemplary embodiment, the means 906, 908, 910, 912 for connecting snout loop 904 to liquid transport arm 534a, 534b may be a rigid rod that is affixed to both the snout loop 904 and liquid transport arm 534a, 534b. The rigid rod may be secured to snout loop 904 and liquid transport arm 534a, 534b by any conventional means for affixing a rigid rod to a solid, rigid, or flexible material. In another exemplary embodiment, liquid transport arm 534a, 534b may be placed in communication with snout loop 904 by affixing the connecting means 906, 908, 910, 912 to a location on the circumference of snout loop 904.

Figure 10:
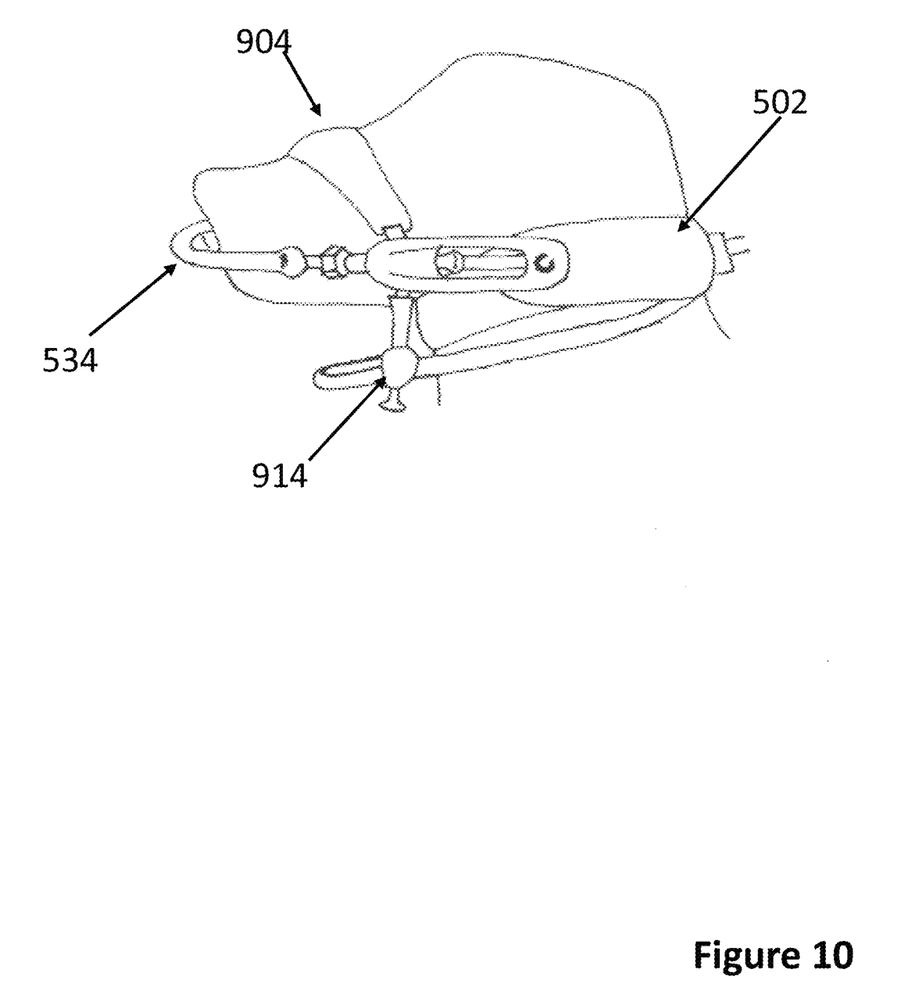
FIG. 10 is a side view of the present invention according to the present invention

FIG. 10 depicts the exemplary embodiment of the dog collar of FIG. 9 in side view. As shown The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for rehydrating a dog comprising:
   a. a handheld rehydrating liquid reservoir for containing a rehydrating liquid, the handheld rehydrating liquid reservoir for delivering the hydrating liquid;
   b. a flexible tube coupled to the handheld rehydrating liquid reservoir for receiving the rehydrating liquid, wherein the hydrating liquid is gravity fed to the flexible tube;
   c. liquid transport conduit coupled to the flexible tube, the liquid transport conduit for receiving the rehydrating liquid from the flexible tube, wherein the liquid transport conduit is contained entirely within a dog collar; and
   d. a liquid delivery arm coupled to the liquid transport conduit, the liquid delivery arm for receiving the rehydrating liquid, the liquid delivery arm for delivering the rehydrating liquid adjacent to a dog's mouth.

2. The system according to claim 1, wherein the liquid delivery arm is elliptical in shape.

3. The system according to claim 1, wherein the liquid delivery arm includes a mouthpiece.

4. The system according to claim 1, wherein the liquid delivery arm is adjustable.

5. A dog collar for rehydrating a dog comprising:
   a. a neckband, the neckband including a neckband first end and a neckband second end;
   b. a liquid delivery transport channel, the liquid delivery transport channel including a liquid delivery transport channel first end and a liquid delivery transport channel second end, wherein the liquid delivery transport channel is contained entirely inside the neckband; and
   c. a flexible hose coupled to the liquid delivery transport channel for delivering a hydrating liquid to the liquid delivery transport channel.

6. The dog collar according to claim 5, further including a liquid delivery arm coupled to the liquid delivery transport channel.

7. The dog collar according to claim 5, wherein the liquid delivery arm includes a mouthpiece.

8. The dog collar according to claim 5, wherein the liquid delivery arm is adjustable.

9. The dog collar according to claim 5, wherein the liquid delivery arm is rotatably coupled to the neckband.

10. A system for rehydrating a dog comprising:
   a. a handheld rehydrating liquid reservoir including a rehydrating liquid tank for containing a rehydrating liquid, wherein the rehydrating liquid tank provides the rehydrating liquid, and wherein a portion of the rehydrating liquid tank is included in a liquid reservoir outer enclosure;
   b. a handle affixed to the liquid reservoir outer enclosure for use in transporting the handheld rehydrating liquid reservoir;
   c. a flexible tube coupled to the rehydrating liquid tank for transporting the rehydrating liquid;
   d. a dog collar including a liquid transport channel coupled to the flexible tube, the liquid transport channel for receiving the rehydrating from the flexible tube, wherein the liquid transport channel is entirely contained inside the dog collar, and wherein the liquid transport channel includes a transport channel first end and a liquid transport channel second end wherein the dog collar includes a dog collar first end and a dog collar second end; and e. a liquid delivery arm having a liquid delivery arm first end and a liquid delivery arm second end, wherein the liquid delivery arm is coupled to the liquid transport channel, the liquid delivery arm for receiving the rehydrating liquid from the liquid transport channel, wherein the liquid delivery arm first end is in communication with the dog collar first end and the liquid delivery arm second end is in communication with the dog collar second end.

11. The system according to claim 10, wherein the liquid delivery arm is elliptical in shape.

12. The system according to claim 11, wherein the liquid delivery arm includes a mouthpiece, wherein the mouthpiece is included midway between the liquid delivery arm first end and liquid delivery arm second end.

13. The system according to claim 12, wherein the mouthpiece comprises an edible treat.

14. The system according to claim 10, wherein the means for controlling the rate includes:

a. a manually actuated trigger, b. a rod in physical communication with the manually actuated trigger, wherein the manually actuated trigger is configured to cause the rod to move with manually actuated trigger is moved, c. a rehydrating liquid barrier in communication with the rod, wherein the rehydrating liquid barrier is in communication with the flexible tube for preventing the flexible tube from receiving the hydrating liquid from the rehydrating liquid tank.

* * * * *